Patented Dec. 18, 1923.

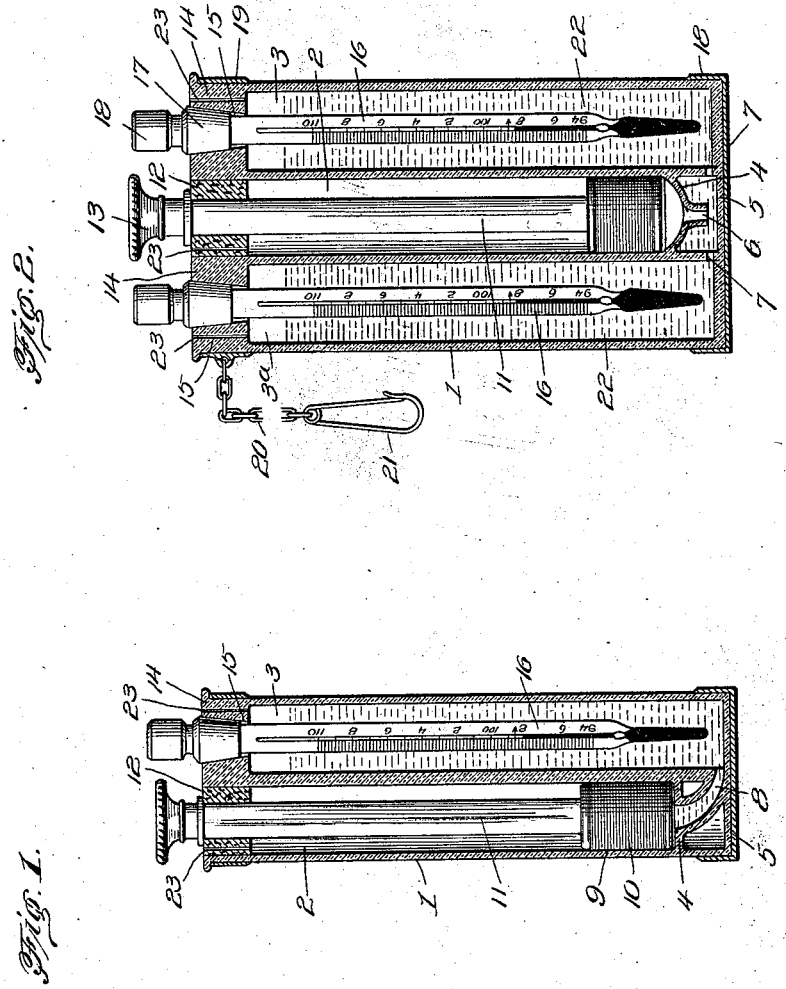

1,478,286

UNITED STATES PATENT OFFICE.

ASA C. D. McCLELLAN, OF MEMPHIS, TENNESSEE.

THERMOMETER CASE.

Application filed February 24, 1922. Serial No. 538,899.

*To all whom it may concern:*

Be it known that I, ASA C. D. McCLELLAN, a citizen of the United States, residing at Memphis, in the county of Shelby and State of Tennessee, have invented certain new and useful Improvements in Thermometer Cases, of which the following is a specification.

This invention has reference to clinical thermometer cases and its object is to provide a receptacle for clinical thermometers, preferably a plurality of clinic thermometers, whereby the thermometer tubes are held against damage, and may, while being carried, be subjected to the action of antiseptic liquids.

Since clinical thermometers are customarily used in connection with the cavities of the human body and oftentimes are only imperfectly cleansed before being used in connection with other patients, there is constant danger of the transmission of disease from one patient to another and such danger of transmission is oftentimes a serious menace to the patient.

In accordance with the invention, there is provided a case or receptacle capable of receiving and holding one or more clinical thermometers.

The invention comprises a casing, preferably of glass, so as to be unaffected by the sterilizing liquid which may be used.

The casing is so constructed as to accommodate clinical thermometers which latter need not differ from ordinary clinical thermometers, and the casing is further so constructed and assembled that it will accommodate one or two such thermometers and a pump-like structure of syringe type so arranged as to force the sterilizing liquid so arranged that, on the manipulation of syringe-like pump piston, the sterilizing liquid will be forced into those portions of the casing or receptacle in which the clinical thermometer or thermometers are located. The casing is made of such size as to accommodate the reciprocable piston and has passages therefrom leading to the portions of the casing intended to receive the clinical thermometers.

The parts are so proportioned and are of such capacity that a complete stroke of the piston in the outward or suction direction will practically empty the thermometer chamber or chambers of the antiseptic solution, and when the piston is forced in the opposite direction the thermometer chamber or chambers will become filled with the antiseptic solution to the required depth.

With the parts in the filled position, the thermometer casing may be carried in the pocket of the user and the thermometers are then bathed in antiseptic solution to so remain until the user desires to empty the thermometer chamber or chambers of the liquid to permit the withdrawal of a thermometer or the thermometers for use.

The thermometer case may be made of minimum size so as to be readily carried in the pocket of a physician or nurse without being at all obtrusive.

The invention will be best understood from a consideration of the following detailed description taken in connection with the accompanying drawing forming part of this specification with the understanding that the invention is not confined to any strict conformity with the showing of the drawing but may be changed and modified so long as such changes and modifications mark no material departure from the salient features of the invention as expressed in the appended claims.

In the drawings:—

Figure 1 is a longitudinal, substantially central, section through the thermometer casing and showing a thermometer receptacle or chamber and an impelling piston for filling or emptying the thermometer chamber, Fig. 2 is a similar section to that of Fig. 1, with the plane of the section sufficiently extended to include two thermometer chambers and an impelling piston common to both.

Referring to the drawings, there is shown a casing 1, which, because of its capability of resisting the effect of sanitary liquids, may be made of glass, such substance also being readily moulded into shape. The casing 1 may be rectangular in contour and be formed with two compartments 2 and 3, respectively, as in Fig. 1, or with three compartments 2, 3 and 3ª, as indicated in Fig. 2. The compartment 2 is provided with a bottom or floor portion 4 elevated a short distance above the bottom 5, of the compartment 2.

Leading from the bottom 4, downwardly toward the bottom 5 of the receptacle or chamber 2, is a duct 6, stopping short of the bottom 5, by a short distance, and leading through the walls of the receptacle or compartment 2, into the receptacles or compartments 3 and 3ª, respectively, are other ducts 7 in the structure shown in Fig. 2, while in the structure shown in Fig. 1, the duct 6 is in the form of a curved duct 8 facing the interior of the compartment 2 in communication with the bottom end of the compartment 3.

Within the compartment 2 in either of the forms shown in Figs. 1 and 2, is a piston 9, constructed to make smooth, air-tight contact with the wall of the compartment 2. The piston 9 may be provided with a thin coating 10 of cork or other packing secured to the body of the piston in any suitable manner.

The piston 9 is carried by a piston rod 11 extending lengthwise of the compartment 2 and thence through a cork stopper 12 whereby the piston rod 11 makes liquid-tight contact with the stopper. The piston rod 11 rises through the stopper 12 and is there provided with a handle 13, by means of which the piston rod and piston may be manipulated.

The compartment 3 in the structure of Fig. 1 and the compartments 3 and 3ª in the structure of Fig. 2, are closed at their upper ends by glass closures 14, conveniently made of the stated material because the closures 14 may be formed in one piece with the casing 1, as by casting. Each closure 14 is provided with a taper passage 15, of appropriate size and made slightly tapered so as to pass the tube of a clinical thermometer 16, of customary construction and so needing no special description.

The clinical thermometer 16 is of such length and size that a stopper member 17 in the form of an appropriate taper sleeve may be applied to the upper or outer end of the thermometer so as to wedge in the passage 15, leaving a hand-hold 18 exterior to the casing 1, for each thermometer, in order that the thermometer may be introduced into the compartment 3 or 3ª and be accessible for manipulation as desired. Sleeves 17 may be cemented to or otherwise secured to the stem of the thermometer.

For the purposes of protection and ornamentation the casing 1 has about its lower end considering the casing as upright, a metal ornamentation 18, applied thereto and the upper end of the casing also has a metal reinforcement 19 to which there is applied a chain 20 terminating in a clip 22 by means of which the casing may be attached to the clothing of the user to prevent loss.

Introduced into the interior of the casing 1 by means of a pipette or by other instrumentality is a quantity 22 of a suitable antiseptic liquid. Such liquid may be introduced into the casing by removing the thermometer or thermometers and filling the compartment 3 or 3ª or both, as the case may be with the liquid 22, the piston 9 being first moved to the lowered or depressed position and the quantity of liquid employed about half filling the compartment 3 or 3ª or both.

Free access of air to the compartments 2 and 3 and 3ª is permitted by way of passages 23 of minute diameter formed through the closures 14 or the cork closure 12.

What is claimed is:—

1. Means for carrying and sterilizing clinical thermometers, comprising a glass case with a plurality of elongated compartments arranged contiguously and intercommunicating and including a reciprocatory syringe-like piston arranged in one of the compartments with the piston compartment containing a piston-rod, accessible exterior to the compartment containing it, and the compartments being also provided with removable stoppers for permitting access to the respective compartments and the sealing of the compartments against leaking, certain of said stoppers constituting thermometer removing elements.

2. A clinical thermometer case for carrying and sterilizing one or more clinical thermometers, comprising a casing resistant to the sterilizing liquid and comprising a plurality of compartments adapted to receive thermometers and each provided with a stopper member in the form of an appropriate taper sleeve for application to the upper end of the thermometer so as to wedge about the thermometer and provided with a hand hold exterior to the thermometer case, a piston within one of the compartments and carried by a piston rod extending lengthwise of the compartment within which it is lodged, a stopper through which the piston rod rises and exterior to the compartment provided with a handle by means of which the piston rod may be reciprocated, and a duct in the compartment communicating with the other compartment for distributing sterilizing liquid in the compartment containing the piston to the other compartments in the case.

3. A clinical thermometer case for carrying and sterilizing clinical thermometers, comprising a casing provided with means to constitute a plurality of thermometer receiving compartments and a piston receiving compartment, said piston receiving compartment of less length than the length of either of the other compartments and further having the bottom thereof apertured, said means providing said compartments ported whereby in connection with the port of the bottom of the piston receiving compartment communication is established between the several compartments, means for closing said piston receiving compartment and further providing for the passage of the piston rod of the piston therethrough, and stopper elements each having a portion thereof engageable with said casing for closing a thermometer receiving compartment and the remaining portion projecting from the casing to provide a hand hold, that portion of each stopper element engageable with the casing and further engageable with a thermometer for removing it from a compartment when the stopper element is disconnected from the casing.

4. A clinical thermometer case for carrying and sterilizing clinical thermometers, comprising a casing provided with means to constitute a plurality of thermometer receiving compartments and a piston receiving compartment, said piston receiving compartment of less length than the length of either of the other compartments and further having the bottom thereof apertured, said means providing said compartments ported whereby in connection with the port of the bottom of the piston receiving compartment communication is established between the several compartments, means for closing said piston receiving compartment and further providing for the passage of the piston rod of the piston therethrough, and stopper elements each having a portion thereof engageable with said casing for closing a thermometer receiving compartment and the remaining portion projecting from the casing to provide a hand hold, that portion of each stopper element engageable with the casing and further engageable with a thermometer for removing it from a compartment with the stopper element is disconnected from the casing, that portion of each of said stopper elements engaging with the casing being tapered.

In testimony whereof, I affix my signature hereto.

ASA C. D. McCLELLAN.